(12) United States Patent
Ash et al.

(10) Patent No.: US 8,732,402 B2
(45) Date of Patent: *May 20, 2014

(54) MANAGING TRACK DISCARD REQUESTS TO INCLUDE IN DISCARD TRACK MESSAGES (71) Applicant: International Business Machines Corporation, Armonk, NY (US)

(72) Inventors: Kevin J. Ash, Tucson, AZ (US); Michael T. Benhase, Tucson, AZ (US); Lokesh M. Gupta, Tucson, AZ (US); Kenneth W. Todd, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/786,990

(22) Filed: Mar. 6, 2013

(65) Prior Publication Data
US 2013/0198461 A1    Aug. 1, 2013

Related U.S. Application Data

(63) Continuation of application No. 13/113,962, filed on May 23, 2011.

(51) Int. Cl.
*G06F 12/00* (2006.01)
(52) U.S. Cl.
USPC ............................. 711/133; 711/119; 711/162
(58) Field of Classification Search
USPC .................................................. 711/133, 119
See application file for complete search history.

(56) References Cited

U.S. PATENT DOCUMENTS

| | | | | |
|---|---|---|---|---|
| 5,475,856 | A | * | 12/1995 | Kogge ............................ 712/20 |
| 5,574,902 | A | | 11/1996 | Josten et al. |
| 5,636,359 | A | | 6/1997 | Beardsley et al. |
| 6,513,097 | B1 | | 1/2003 | Beardsley et al. |
| 7,124,128 | B2 | * | 10/2006 | Springer et al. ....................... 1/1 |

OTHER PUBLICATIONS

D. Wackerow, "MQSeries Primer: MQSeries Enterprise Application Integration Center", IBM Corporation, Oct. 1999, pp. 1-34.
B. Dufrasne, et al., "IBM System Storage DS8000:Architecture and Implementation", IBM Corporation, Redbooks, Oct. 2009, pp. 1-620.

(Continued)

*Primary Examiner* — Reginald Bragdon
*Assistant Examiner* — Hannah A Faye-Joyner
(74) *Attorney, Agent, or Firm* — Kon Rad Raynes Davda & Victor LLP; David W. Victor (57) ABSTRACT

Provided is a method for managing track discard requests. A backup copy of a track in a cache is maintained in a cache backup device. A track discard request is generated to discard tracks in the cache backup device removed from the cache. Track discard requests are queued in a discard track queue. If a predetermined number of track discard requests are queued in the discard track queue while processing in a discard multi-track mode, one discard multiple tracks message is sent to the cache backup device indicating the tracks indicated in the queued predetermined number of track discard requests to instruct the cache backup device to discard the tracks indicated in the discard multiple tracks message. If a predetermined number of periods of inactivity while processing in the discard multi-track mode, processing the track discard requests is switched to a discard single track mode.

7 Claims, 4 Drawing Sheets

(56) References Cited

OTHER PUBLICATIONS

U.S. Appl. No. 13/113,962, filed May 23, 2011, entitled, "Managing Track Discard Requests to Include in Discard Track Messages", invented by Kevin J. Ash et al. pp. 1-26.

Preliminary Amendment dated Mar. 6, 2013, for U.S. Appl. No. 13/113,962, filed May 23, 2011, pp. 1-8.

Office Action dated Jun. 7, 2013, pp. 17, for U.S. Appl. No. 13/113,962, filed May 23, 2011.

Response dated Sep. 9, 2013, pp. 8, to Office Action dated Jun. 7, 2013, pp. 17, for U.S. Appl. No. 13/113,962, filed May 23, 2011.

Office Action dated Dec. 19, 2013, pp. 14, for U.S. Appl. No. 13/113,962, filed May 23, 2011.

* cited by examiner

MANAGING TRACK DISCARD REQUESTS TO INCLUDE IN DISCARD TRACK MESSAGES

RELATED APPLICATIONS

This patent application is a continuation of U.S. patent application Ser. No. 13/113,962, filed on May 23, 2011, which patent application is incorporated herein by reference in its entirety.

BACKGROUND OF THE INVENTION

1. Field of the Invention

The present invention relates to a computer program product, system, and method for managing track discard requests to include in discard track messages.

2. Description of the Related Art

In a dual cluster system, each cluster includes a processing complex, cache and non-volatile backup storage (NVS). Each cluster is assigned a plurality of volumes, where volumes may be grouped in Logical Subsystems (LSSs). Data being written to a volume may be stored in the cache of the cluster to which the data is assigned. In certain situations, a copy of data in cache is also copied to the NVS of the other cluster to provide a backup copy. In this way, if there is a failure, the modified data in cache is preserved in the other cluster.

Tracks may be removed from cache by a cache controller performing cache management operations to destage tracks in cache to storage and by discard scan processes removing tracks for a volume being deleted. Multiple discard scan processes may concurrently execute to remove tracks in cache for a volume for different sections of the cache. After a track is removed from cache in one cluster, a message must be sent to the other cluster to instruct the other cluster to remove that same track from the NVS providing a backup copy of the track removed from the cache.

There are two methods used to send a message to the NVS to discard tracks removed from the cache the NVS is backing-up, Discard Single Track and Discard Multi Track. When a Discard Single Track method is used, only one track is identified in the message to discard and the mail message will contain additional information to perform congruency checking between the cache data for the track and the NVS data for the track. When a Discard Multi Track method is used, each mail message will indicate multiple tracks to be removed, e.g., 20, and only the track identifier (ID) and track location for each of the tracks are contained in the message data.

To improve performance during host Input/Output (I/O) activity, track discard requests are queued until either a predetermined number, e.g., 20, is accumulated to send in a single discard multiple tracks message or until a predetermined period, e.g., 1 millisecond, has passed, so that any track discard requests accumulated during that 1 millisecond are sent in a single discard multiple tracks message. If there is only one queued request, then a discard single track message may be sent.

The cache controller may also determine whether 1 millisecond has passed without sending a discard message when queued requests exist to cause the presently queued tracks to be sent. There are times when the cache controller will "sleep" for 10 milliseconds at a time due to finding no work to do (i.e. times with no host I/O). Such a 10 millisecond delay in the cache controller will delay the sending of queued track requests that are less than the amount needed for a discard multiple tracks message.

There is a need in the art for improved techniques for managing queued track discard requests.

SUMMARY

Provided are a computer program product, system, and method for managing track discard requests to include in discard track messages. A backup copy of a track in a cache is maintained in the cache backup device. A track discard request is generated to discard tracks in the cache backup device removed from the cache. Track discard requests are queued in a discard track queue. In response to detecting that a predetermined number of track discard requests are queued in the discard track queue while processing in a discard multi-track mode, one discard multiple tracks message is sent indicating the tracks indicated in the queued predetermined number of track discard requests to the cache backup device instructing the cache backup device to discard the tracks indicated in the discard multiple tracks message. In response to determining a predetermined number of periods of inactivity while processing in the discard multi-track mode, processing the track discard requests is switched to a discard single track mode.

DETAILED DESCRIPTION

Figure 1:
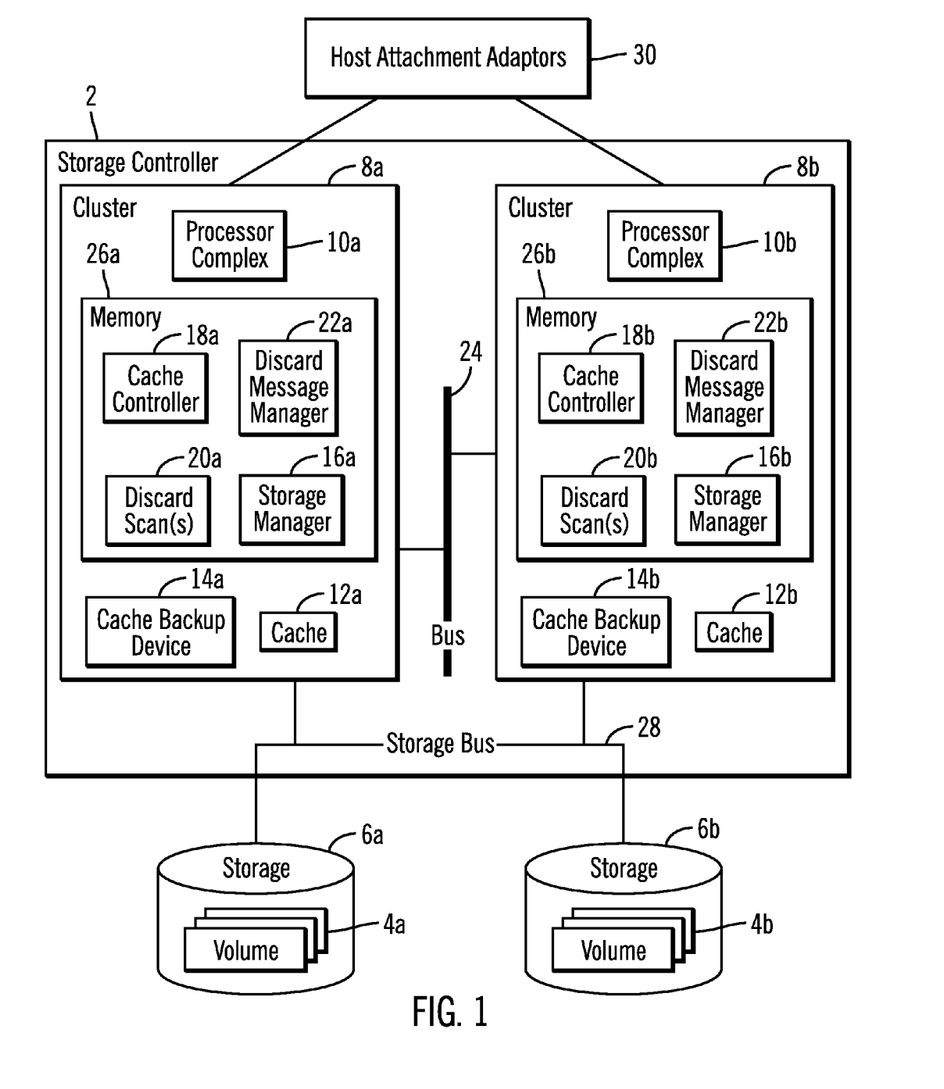
FIG. 1 illustrates an embodiment a computing environment.

FIG. 1 illustrates an embodiment of a computing environment. A plurality of hosts (not shown) may submit Input/Output (I/O) requests to a storage controller 2 to access data at volumes 4a, 4b (e.g., Logical Unit Numbers, Logical Devices, Logical Subsystems, etc.) in storages 6a, 6b. The storage controller 2 includes at least two clusters 8a, 8b. Each cluster 8a, 8b includes a processor complex 10a, 10b including one or more processors with single or multiple cores, a cache 12a, 12b, and a cache backup device 14a, 14b to backup tracks in the cache 12a, 12b. Each cache backup device 14a, 14b in one cluster 8a, 8b may provide backup of tracks in the cache 12b, 12a, respectively, in the other cluster 8a, 8b. For instance, cache backup device 14a may backup data in the cache 12b and cache backup device 14b may backup data in the cache 12a. In certain embodiments, the cache backup devices 14a, 14b may provide non-volatile storage of tracks in the cache 12a, 12b, such as non-volatile backup storages or memory devices. The clusters 8a, 8b receive I/O requests from the hosts and buffer the requests and write tracks in their respective cache 12a, 12b directed to the storage 6a, 6b.

Each cluster 12a, 12b includes a storage manager 16a, 16b, cache controller 18a, 18b, discard scans 20a, 20b, and discard message manager 22a, 22b. The storage managers 16a, 16b manage host I/O requests directed to tracks in the storages 6a, 6b. A track may comprise any unit of data configured in the storage 6a, 6b, such as a track, Logical Block Address (LBA), etc., which is part of a larger grouping of tracks, such as a volume, logical device, etc. The cache controllers 18a, 18b manage tracks in the caches 12a, 12b. Discard scans 20a, 20b comprise processes initiated to discard tracks in the cache 12a, 12b and the cache backup device 14b, 14a, respectively, providing a backup copy of the tracks discarded in the cache 12a, 12b. A discard message manager 22a, 22b receives track discard requests from the discard scans 20a, 20b and the cache controller 18a, 18b to discard a track from the cache backup device 14a, 14b when the corresponding track has been removed from the cache 12a, 12b. The discard message manager 22a, 22b generates track discard messages to send over the communication link 24 to the other cluster 8a, 8b to instruct the other cluster 8a, 8b to remove the track from the cache backup device 14a, 14b.

Some or all of the components 16a, 16b, 18a, 18b, 20a, 20b, 22a, 22b may comprise programs loaded into a memory 26a, 26b that are executed by the processor complex 10a, 10b or may be implemented in hardware devices in the clusters 8a, 8b, such as in Application Specific Integrated Circuits (ASICs).

In one embodiment, the caches 12a, 12b may comprise a volatile storage. The caches 12a, 12b may be part of the memory 26a, 26b, respectively, or implemented in a separate memory device. In one embodiment, the cache backup devices 14a, 14b may comprise a non-volatile backup storage (NVS), such as a non-volatile memory, e.g., battery backed-up Random Access Memory (RAM), static RAM (SRAM), etc. Alternative memory and data storage structures known in the art may be used for the caches 12a, 12b and cache backup devices 14a, 14b.

A communication bus 24 provides a communication interface to enable communication between the clusters 8a, 8b, and may utilize communication interface technology known in the art, such as Peripheral Component Interconnect (PCI) bus or other bus interfaces, or a network communication interface. Further, the bus 24 may comprise a processor Symmetrical Multi-Processor (SMP) fabric comprising busses, ports, logic, arbiter, queues, etc. to enable communication among the cores and components in the processor complexes 10a, 10b The clusters 8a, 8b are both capable of accessing volumes 4a, 4b in storage systems 6a, 6b over a shared storage bus 28, which may utilize a suitable storage communication interface known in the art. The storage manager 16a, 16b may also maintain an assignment of volumes 4a, 4b to clusters 8a, 8b owning a volume or group of volumes in the attached storages 6a, 6b, such that an owner cluster 8a, 8b handles the writes to those volumes 4a, 4b that cluster owns by caching the write data and executing the write against the volume.

The clusters 8a, 8b in the storage controller 2 comprise separate processing systems, and may be on different power boundaries and implemented in separate hardware components, such as each cluster implemented on a separate motherboard. The storages 6a, 6b may comprise an array of storage devices, such as a Just a Bunch of Disks (JBOD), Direct Access Storage Device (DASD), Redundant Array of Independent Disks (RAID) array, virtualization device, tape storage, flash memory, solid state storage devices (e.g., EEPROM (Electrically Erasable Programmable Read-Only Memory), flash memory, storage-class memory (SCM)), electronic memory, magnetic tape media, etc.

Host attachment adaptors 30 provide an interface, such as a Storage Area Network (SAN) interface to the storage controller 2. This is the path the systems being served by the storage controller 2 use to access their data. In certain embodiments, the host adaptors 30 write two copies of the data when a host modifies data. One copy to cache, e.g., 12a, one copy to the cache backup device, e.g., 14b, in the other cluster, e.g., 8b. In additional embodiments, the cache controllers 18a, 18b may DMA or directly copy data from their respective caches 12a, 12b over the bus 24 to the cache 12a, 12b or backup storage 14a, 14b in the other cluster 8a, 8b.

Figure 2:
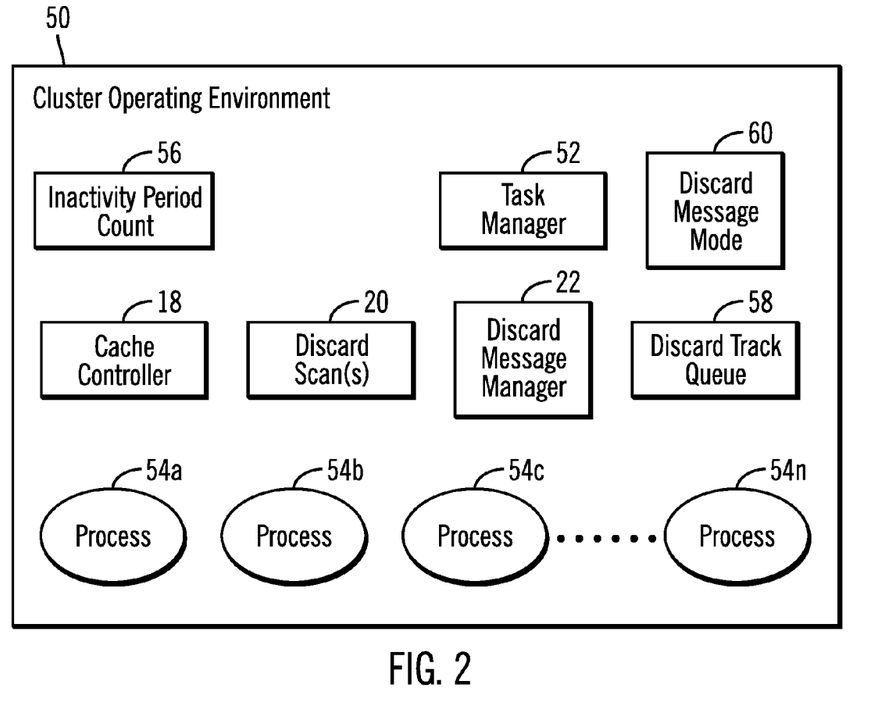
FIG. 2 illustrates an embodiment of a cluster operating environment.

FIG. 2 illustrates an embodiment of a cluster operating environment 50 implemented in each cluster 8a, 8b having a cache controller 18, such as cache controllers 18a, 18b, discard scan(s) 20, such as discard scans 20a, 20b, a discard manager 22, such as discard managers 22a, 22b, and a task manager 52 for assigning processes 54a, 54b, 54c . . . 54n (where n is an integer value) to execute the cache controller 18, discard scan 20 and discard message manager 22 tasks. The processes 54a, 54b, 54c . . . 54n may be executed as separate processes on one or more processors or processor cores in one or more processors, where the cores and processors on which the processes 54a, 54b, 54c . . . 54n execute are part of the processor complexes 10a, 10b. There may be multiple discard scans 20 executing concurrently to discard tracks from the cache 12a, 12b and the corresponding backup track in the cache backup device 14a, 14b. For instance, in response to a request to delete a volume, the cache 12a, 12b is divided into multiple sections of tracks and each of the sections are assigned to a separate discard scan 20 task so multiple discard scan tasks 20 concurrently execute to remove tracks from the cache 12a, 12b for a specified volume or other grouping of data. In an alternative embodiment, there may be only one process executing one discard scan 20 process.

In certain embodiments, the discard scans 20a, 20b after sending a track discard request will not continue to process further tracks in cache 12a, 12b to discard until receiving acknowledgment from the discard message manager 22a, 22b that the track was discarded from the cache backup device 14a, 14b. In other words, each discard scan determines a next entry in the cache 12a, 12b to process in response to determining that the cache backup device 14a, 14b completed the discard of the track indicated in a previously generated track discard request. Thus, any delays by the discard message manager 22a, 22b in processing track discard requests may delay the discard scan 20a, 20b processing.

An inactivity period count 56 is a field indicating a number of concurrent periods of inactivity at the discard message manager 22. The discard message manager 22 queues discard track requests from the cache controller 18 and the discard scans 20 in a discard track queue 58. A discard message mode 60 indicates to the discard message manager 22 whether to process queued discard track requests in discard single track mode or in discard multi-track mode. In discard single track mode, one message is generated for each queued discard track request to send to the cache backup device 14a, 14b to discard the single track indicated in the message. In discard multi-track mode, one message is generated for a predetermined number of queued discard track requests, such as twenty, to send to the cache backup device 14a, 14b to discard the multiple tracks indicated in the message.

The cache controller 18a, 18b may destage tracks from the cache 12a, 12b as part of cache management operations, such as to make space in cache for newer cached tracks using a Least Recently Used (LRU) algorithm. Upon destaging a track from the cache 12a, 12b, the cache controllers 18a, 18b may generate a track discard request, indicating the destaged track, and send to the discard message manager 22 to have that destaged track removed from the cache backup device 14a, 14b. The discards scans 20 (such as discard scans 20a, 20b) may remove tracks from the cache 12a, 12b as part of a discard operation. Upon removing or demoting a track from the cache 12a, 12b, the discard scans 20 may generate a track discard request, indicating the removed track, and send to the discard message manager 22 to have that removed track removed from the cache backup device 14a,14b. In this way, when a track is removed from the cache 12a, 12b by the cache controller 18a, 18b, discard scan 20 or some other process, a track discard request is generated and sent to the discard message manager 22. The discard message manager 22 adds the received track discard request to the discard track queue 58 and then generates discard track messages (single or multi-track) for the queued track discard requests to instruct the cache backup device 14a, 14b to remove the tracks.

Figure 3:
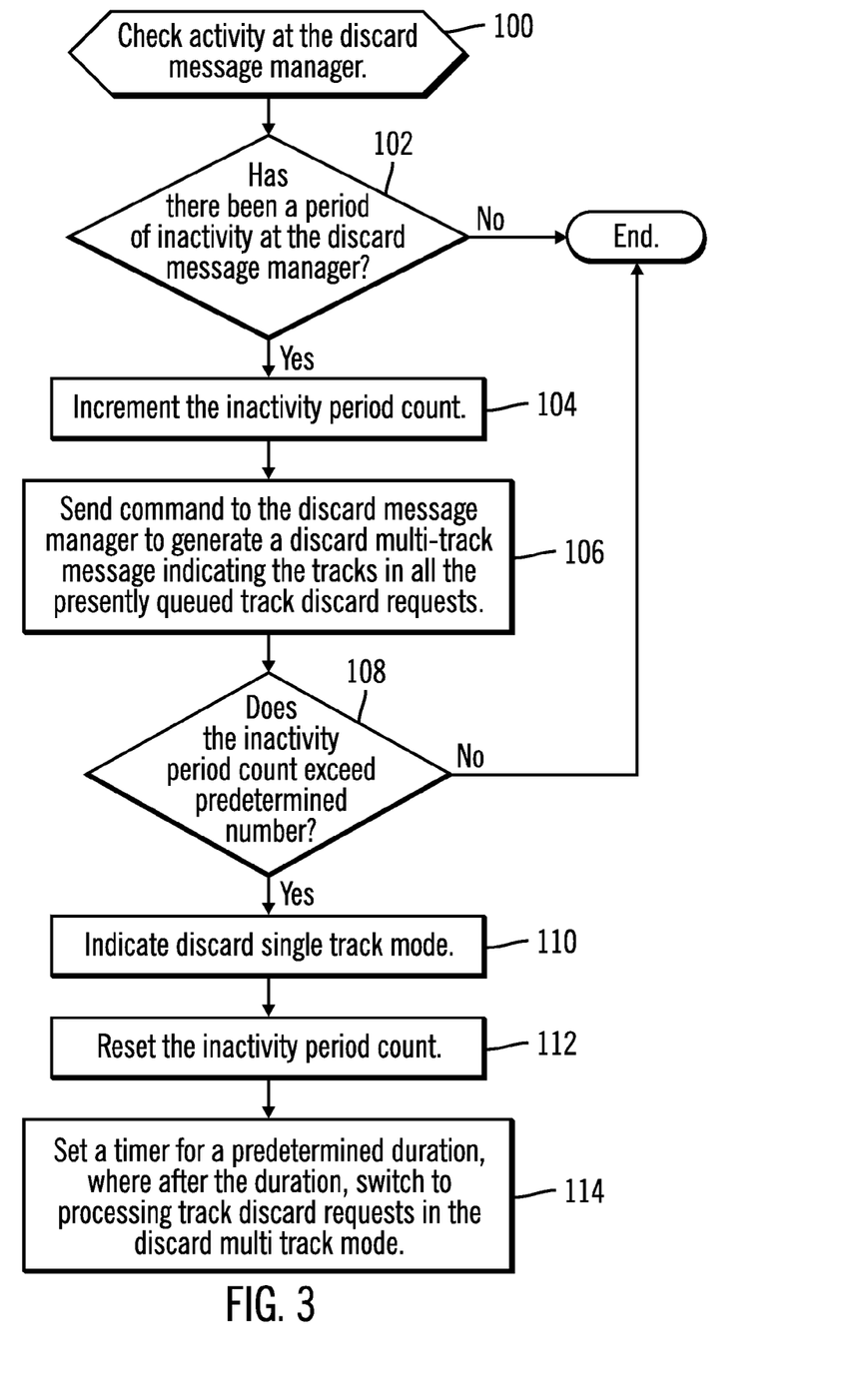
FIG. 3 illustrates an embodiment of operations to monitor activity at the discard message manager.

FIG. 3 illustrates an embodiment of operations to determine whether to change the discard track message mode. The operations of FIG. 3 may be performed by the cache controller 18 (e.g., 18a, 18b) or some other component in the cluster 8a, 8b monitoring the discard message manager 22 (e.g., 22a, 22b). Upon (at block 100) checking the activity level at the discard message manager 22, a determination is made (at block 102) as to whether there has been a predefined period of inactivity at the discard message manager 22. A period of inactivity at the discard message manager 22 may comprise a predetermined elapsed time, such as 1 millisecond, passing at the discard message manager 22 without receiving a track discard request to process. In response to determining such a period of inactivity (from the yes branch of block 102), the inactivity period count 56 is incremented (at block 104).

The cache controller 18 or other component may then send (at block 106) a command to the discard message manager 22 to generate at least one discard multi-track message indicating the tracks in all the presently queued track discard requests in the discard track queue 58. If (at block 108) the inactivity period count 56 exceeds a predetermined number, such as a predetermined number of consecutive inactivity periods, e.g., 10 periods, resulting in a 10-100 millisecond period of inactivity, then the discard single track mode is indicated (at block 110) in the discard message mode 60 to cause the discard message manager 20 to include a single track to discard in a single discard message. Upon setting (at block 110) the discard message mode 60 to single track mode, the inactivity period count 56 is reset (at block 112) and a timer is set (at block 114) for a predetermined duration, such as 1 second. After the expiration of this duration, the discard message mode 60 is set to discard multi-track mode to switch to processing track discard requests in discard multi-track mode. If (at block 102) there has not been period of inactivity or if (from the no branch of block 108) the inactivity period count does not exceed the predetermined number, then control ends.

With the described embodiments, if there have been a certain number of consecutive periods of inactivity, then the discard message manager 22a, 22b may switch to processing messages in discard single track mode, where the discard message manager 22a, 22b starts processing each queued track discard request to include in a discard single track message. This is in addition to the cache controller 18 having the discard message manager 20 send all queued requests if there is an inactivity period of no track discard requests. In an alternative embodiment, the discard message mode 60 may be switched to discard single track mode if there are a certain number of inactivity periods, not necessarily in a row, within a predetermined time.

Figure 4:
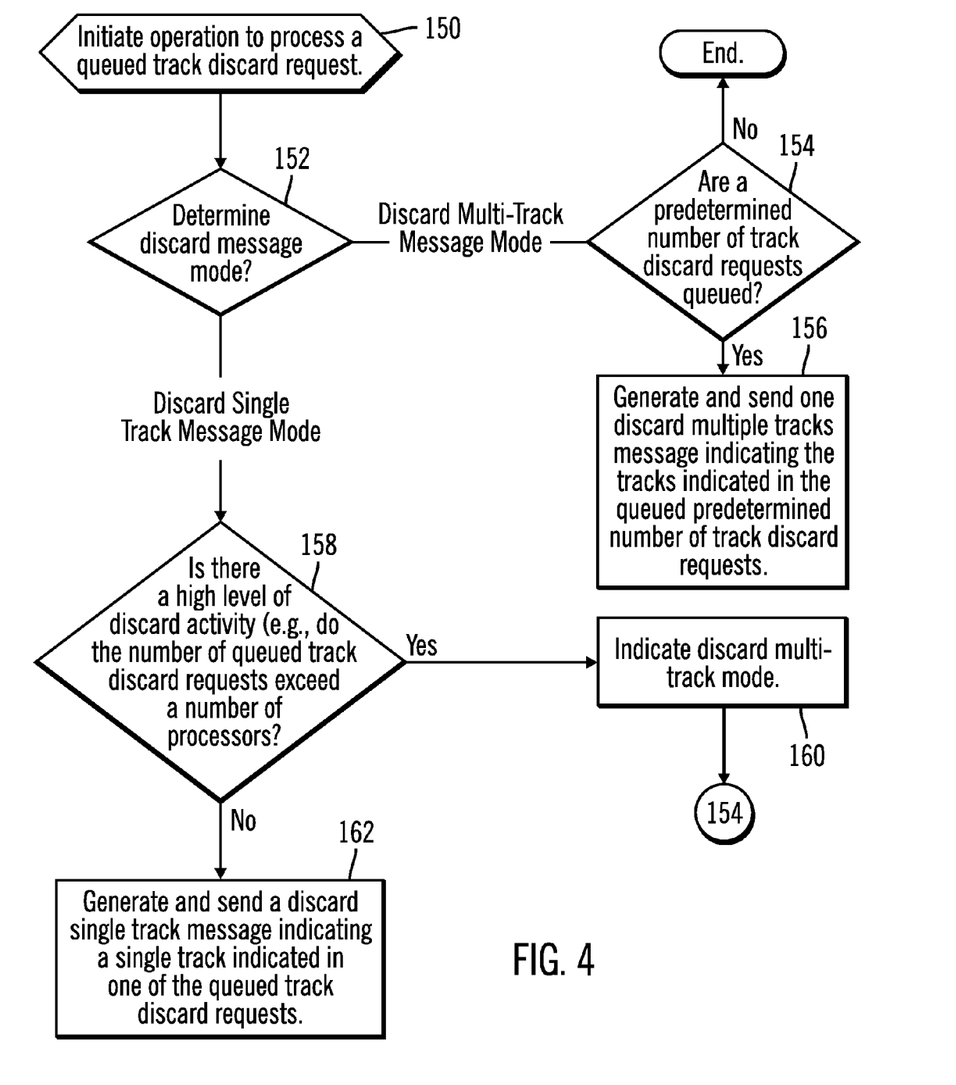
FIG. 4 illustrates an embodiment of operations to generate discard track messages.

FIG. 4 illustrates an embodiment of operations performed by the discard message manager 22 (e.g., 22a, 22b) to process a discard track request in the discard track queue 58. Upon processing (at block 150) a queue track discard request, the discard message manager 22 determines (at block 152) the discard message mode 60. If the discard message mode 60 is discard multi-track mode, then the discard message manager 22a, 22b determines (at block 154) whether there are a predetermined number of track discard requests in the queue 56.

If so, the discard message manager 22 generates and sends (at block 156) one discard multiple tracks message indicating the tracks indicated in the queued predetermined number of track discard requests. If (at block 154) there are not enough (the predetermined number) of queued track discard requests, then control ends.

If (at block 152) the message mode 60 is discard single track mode, then the discard message manager 22a, 22b determines (at block 158) whether there is a high level of discard activity. A high level of discard activity may be determined if the number of queued track discard requests exceed a number of available processes 54a, 54b ... 54n, such as the number of processors currently assigned to process discard scans 20. If (from the yes branch of block 158) there is a determined high level of discard activity, then the discard multi-track mode is indicated (at block 160) in the discard message mode 60 to switch to generating discard multiple tracks messages. Control then proceeds to block 154 to process discard track requests in discard multi-track mode. In this way, if the discard message manager 22 is experiencing higher activity, it may consolidate multiple tracks to discard in a single discard message to conserve resources. If (at block, 158) there is not the determined high level of discard activity, then the discard message manager 22 generates and sends (at block 162) a discard single track message indicating a single track indicated in one of the queued 58 track discard requests to instruct the cache backup device 14a, 14b in the other cluster to discard the track.

In the embodiments described with respect to FIG. 1, the operations of FIGS. 2, 3, and 4 are performed in both clusters 8a, 8b of a dual cluster system. In an alternative embodiment, the operations described with respect to FIGS. 2, 3, and 4 may be performed in a single cluster system such that the discard message manager 22 sends discard (single or multi) track messages to a cache backup device in the same cluster or system including the cache and the discard message manager 22.

Described embodiments provide techniques for determining when to change the discard track message mode in which track discard requests are processed from indicating multiple tracks in one message (discard multi-track mode) to indicating only one track per message to discard (discard single track mode). If discard activity is low, then the discard message manager may switch to processing messages in single track mode, which consumes more resources than multi-track mode to communicate discard requests between clusters faster without delay. If discard activity is high, then to conserve cluster 8a, 8b resources involved in processing track discard requests, the discard message manager may switch back to processing messages in multi-track mode to allow the transfer of one message to instruct the cache backup device 14a, 14b in the other cluster 8a, 8b to discard tracks discarded from the cache 12a, 12b being backed-up.

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The illustrated operations of FIGS. 3 and 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method, comprising:
maintaining in a cache backup device a backup copy of a track in a cache;
generating track discard requests to discard tracks in the cache backup device removed from the cache;
queuing the track discard requests in a discard track queue;
in response to detecting that a predetermined number of the track discard requests are queued in the discard track queue while processing in a discard multi-track mode, sending one discard multiple tracks message indicating the tracks indicated in the queued predetermined number of the track discard requests to the cache backup device instructing the cache backup device to discard the tracks indicated in the discard multiple tracks message; and
in response to determining a predetermined number of periods of inactivity while processing in the discard multi-track mode, switching to processing the track discard requests in a discard single track mode.

2. The method of claim 1, further comprising:
in response to processing in the discard single track mode, sending a discard single track message indicating a single track comprising the track indicated in one of the queued track discard requests to the cache backup device instructing the cache backup device to discard the single track indicated in the discard single track message.

3. The method of claim 1, further comprising:
in response to processing the track discard requests in the discard single track mode for a predetermined duration, switching to processing track discard requests in the discard multi-track mode.

4. The method of claim 1, further comprising:
in response to detecting a high level of discard activity while processing the track discard requests in the discard single track mode, switching to processing the track discard requests in the discard multiple track mode.

5. The method of claim 4,
wherein the track discard requests are generated by a plurality of discard scans removing entries from the cache, wherein each discard scan determines a next entry in the cache to process in response to determining that the cache backup device completed the discard of the track indicated in one of the track discard requests; and
wherein detecting the high level of discard activity, which causes switching to the discard multiple track mode, comprises determining that a number of the queued track discard requests exceeds a number of available processes to generate the single track messages.

6. The method of claim 1, wherein determining a period of inactivity while processing the track discard requests in the discard multi track mode comprises determining that a new track discard request has not been received for a predetermined stall time.

7. The method of claim 1, wherein a first cluster includes the cache, a cache controller, discard scans, and a discard message manager and is in communication via a communication interface with a second cluster having the cache backup device, further comprising:
sending, by the discard scans and the cache controller, the track discard requests to the discard message manager, wherein the discard message manager queues the track discard requests in the discard track queue;
communicating, by the discard message manager, the discard single track and multi-track messages over the communication interface to the second cluster to instruct the second cluster to discard the tracks indicated in the discard single track and multi-track messages from the cache backup device.

* * * * *